United States Patent
Kuhn

[15] 3,679,825
[45] July 25, 1972

[54] APPARATUS AND INFORMATION PROCESSING METHODS FOR A TRACKING SYSTEM TRACKER UNIT

[72] Inventor: Richard B. Kuhn, Columbus, Ohio
[73] Assignee: North American Aviation, Inc.
[22] Filed: Oct. 12, 1964
[21] Appl. No.: 403,397

[52] U.S. Cl. .................................... 178/6.8, 178/DIG. 21
[51] Int. Cl. .......................................................... H04n 3/00
[58] Field of Search ...................... 178/7, 7.2, 6.8, DIG. 21; 250/203; 244/14, 3.16

[56] References Cited
UNITED STATES PATENTS

| | | | |
|---|---|---|---|
| 2,836,421 | 5/1958 | Turner | 273/160 |
| 3,010,024 | 11/1961 | Barnett | 250/203 |
| 3,043,907 | 7/1962 | Martin | 244/14 |
| 3,230,308 | 1/1966 | Lewczyk | 178/6 |

Primary Examiner—Malcolm F. Hubler
Attorney—William R. Lane and Daniel H. Dunbar

[57] ABSTRACT

This invention relates generally to object tracking, and particularly concerns apparatus and information processing methods for a tracker unit that may be advantageously utilized in a tracking system to establish and maintain the viewing axis of an optical-type sensor in the tracking system in a prescribed directional relation with respect to a selected target.

4 Claims, 34 Drawing Figures

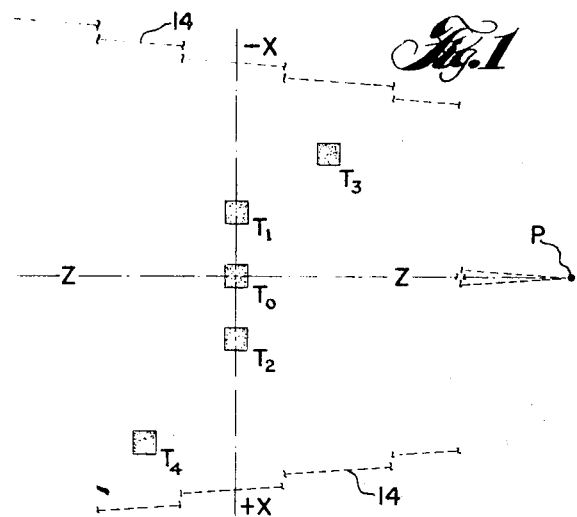
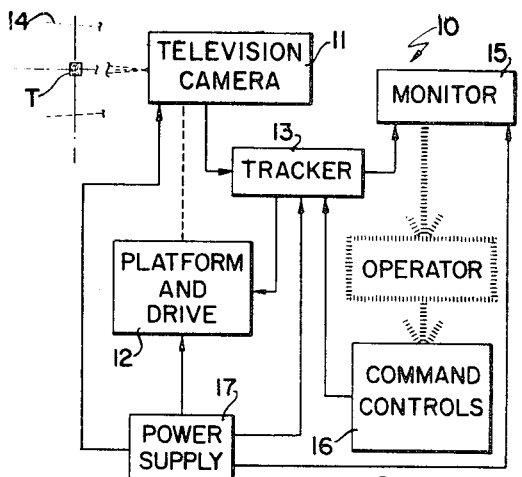
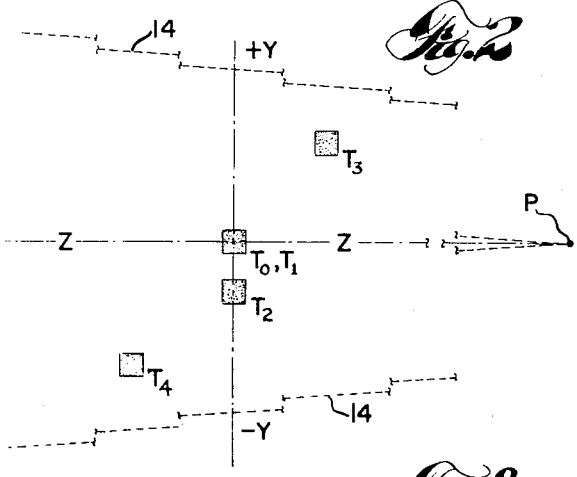
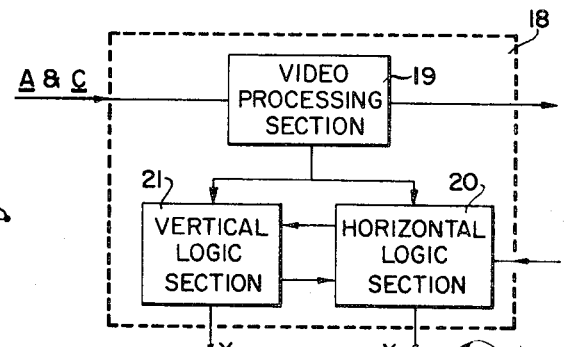
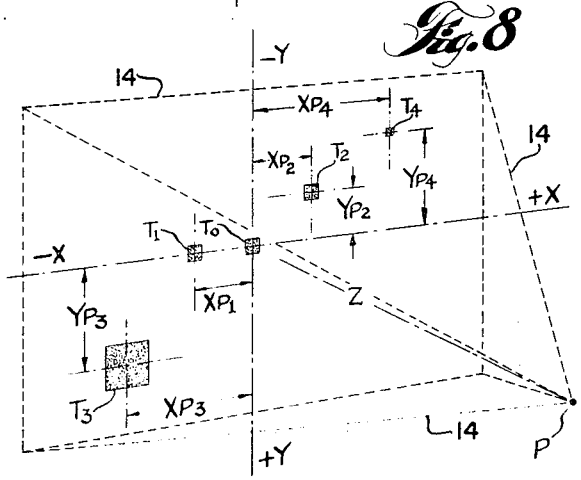
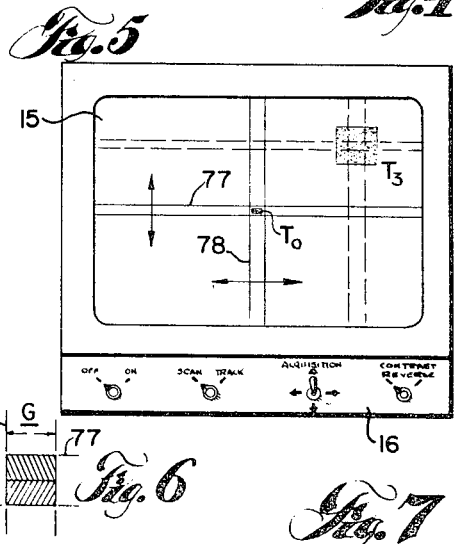
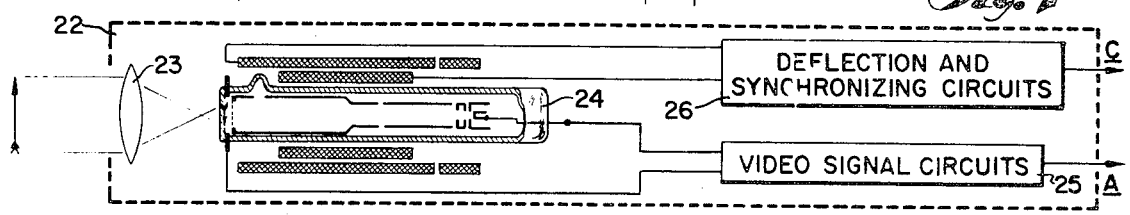

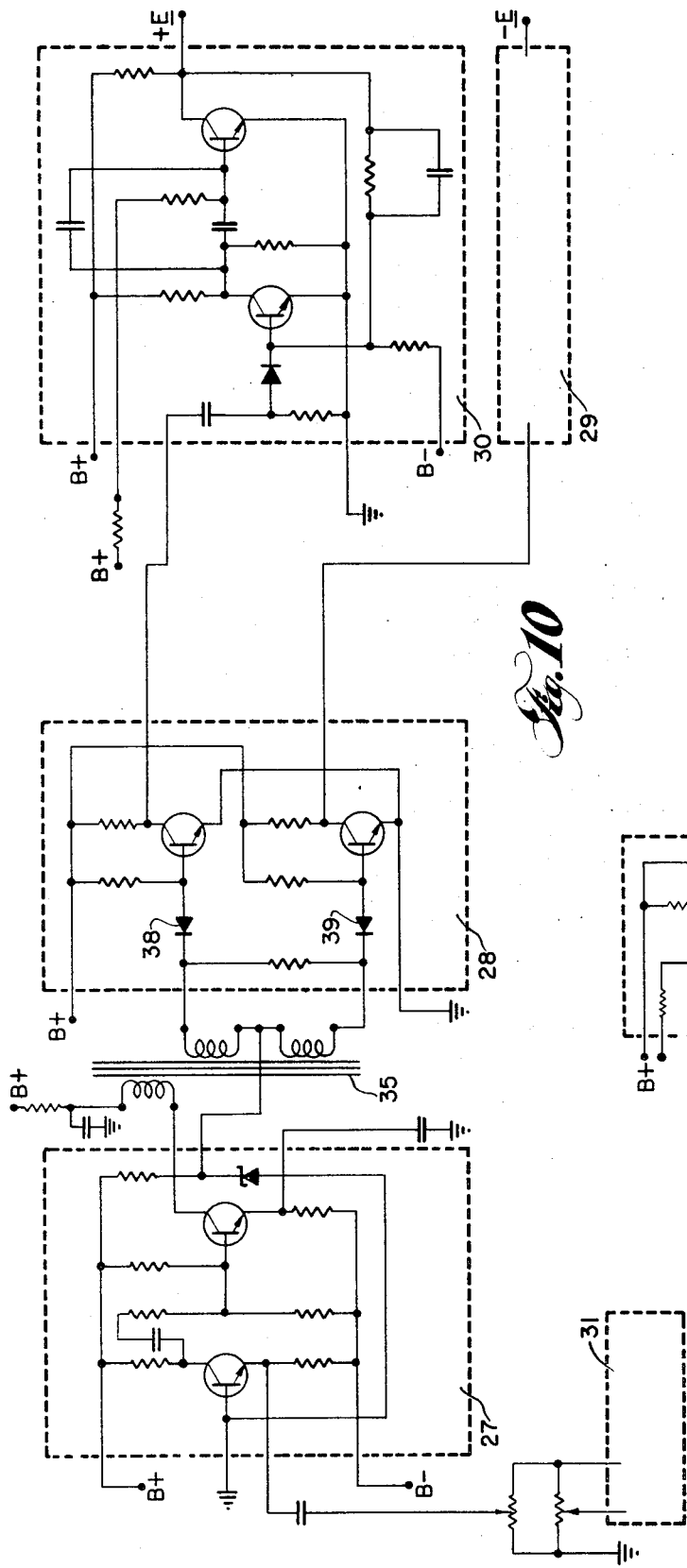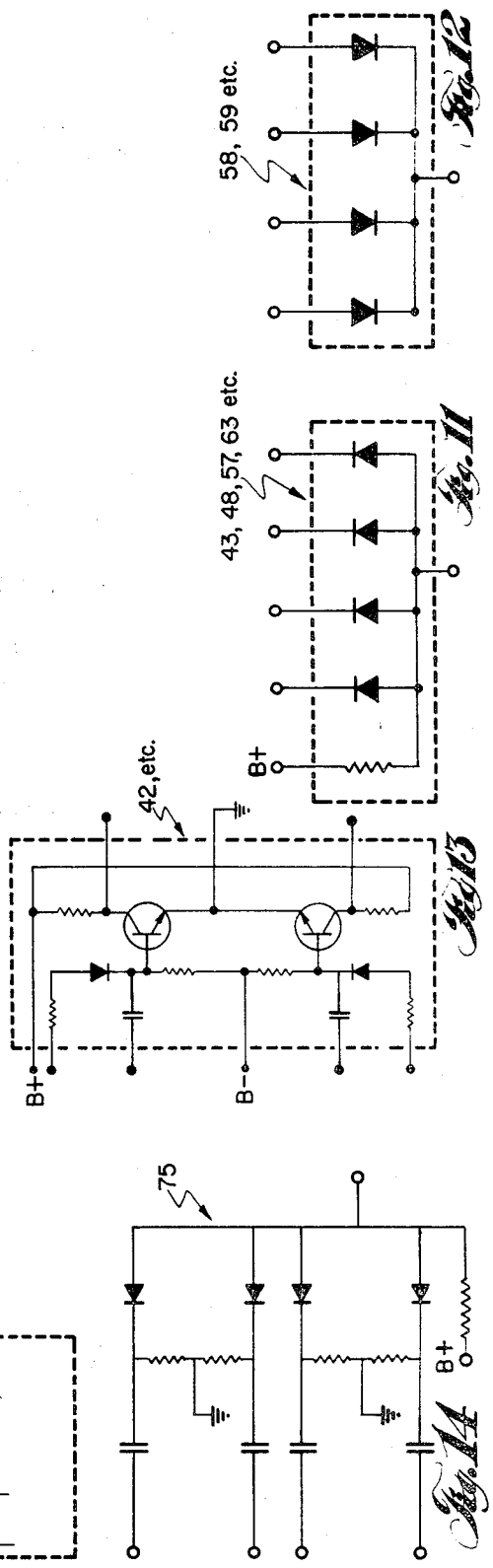

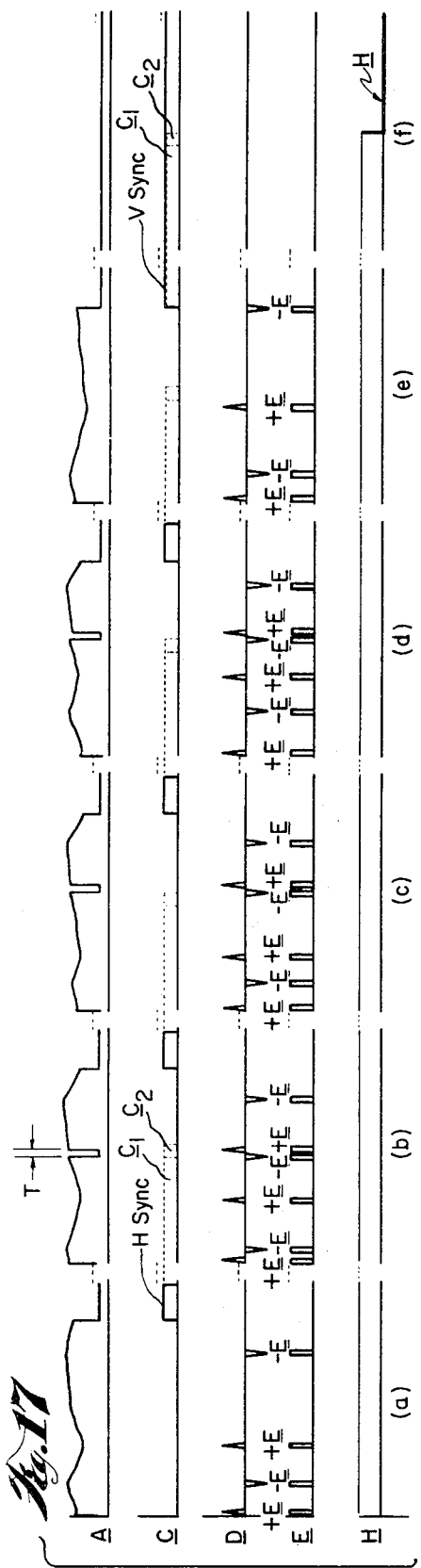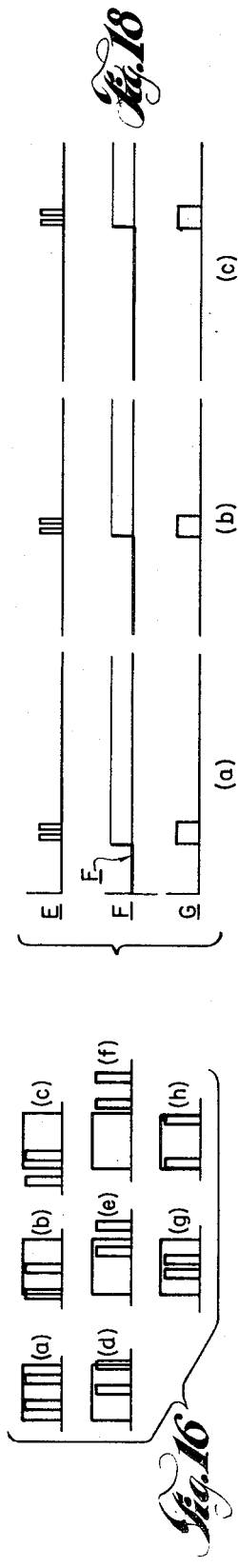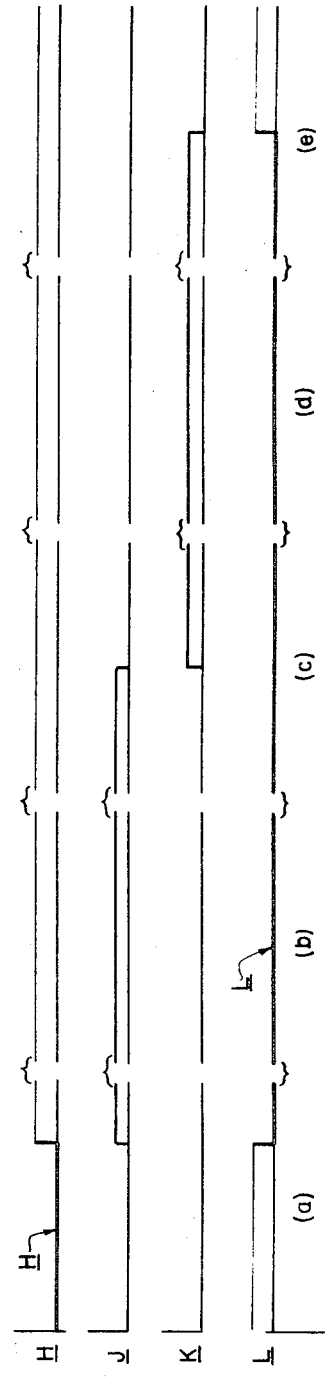

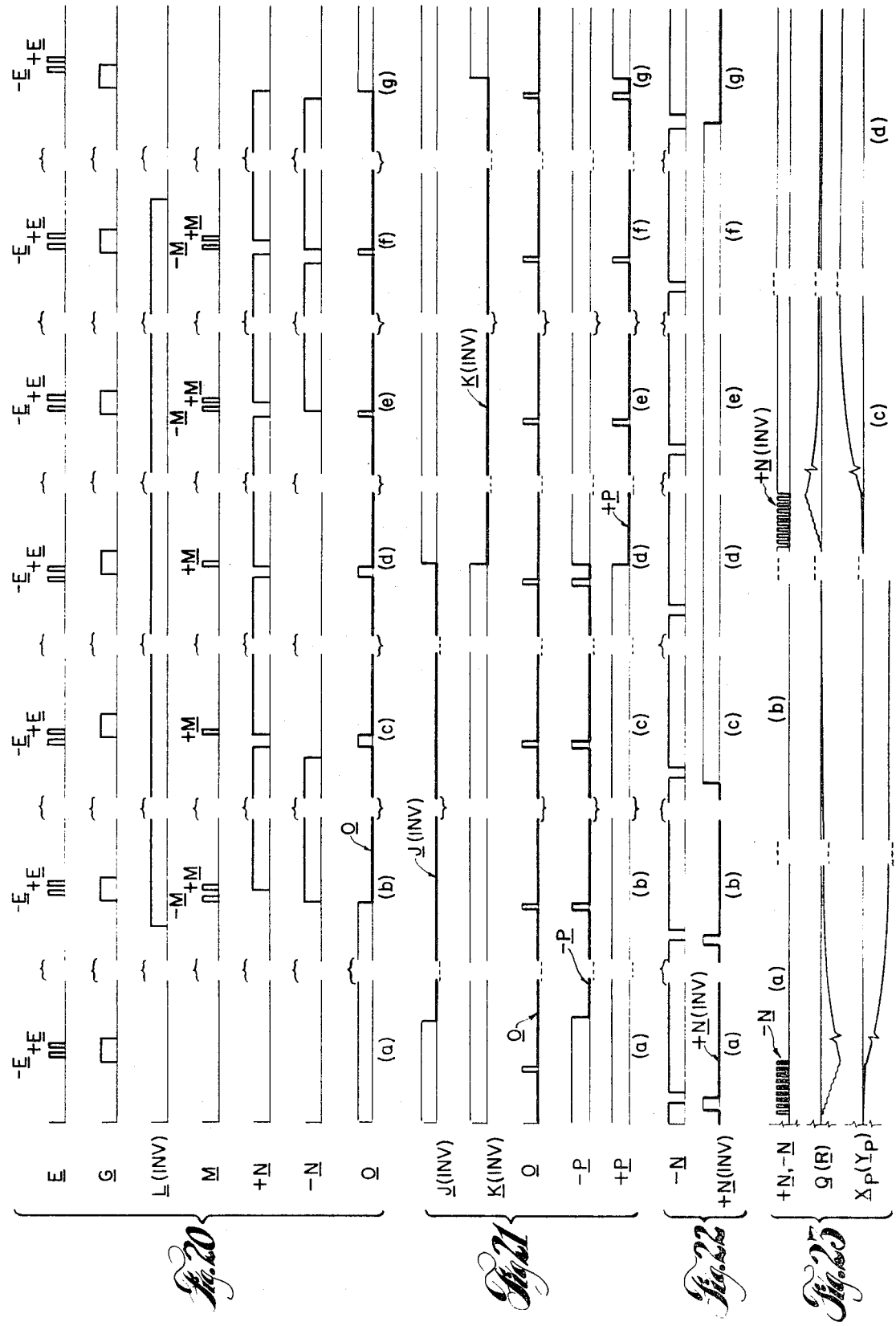

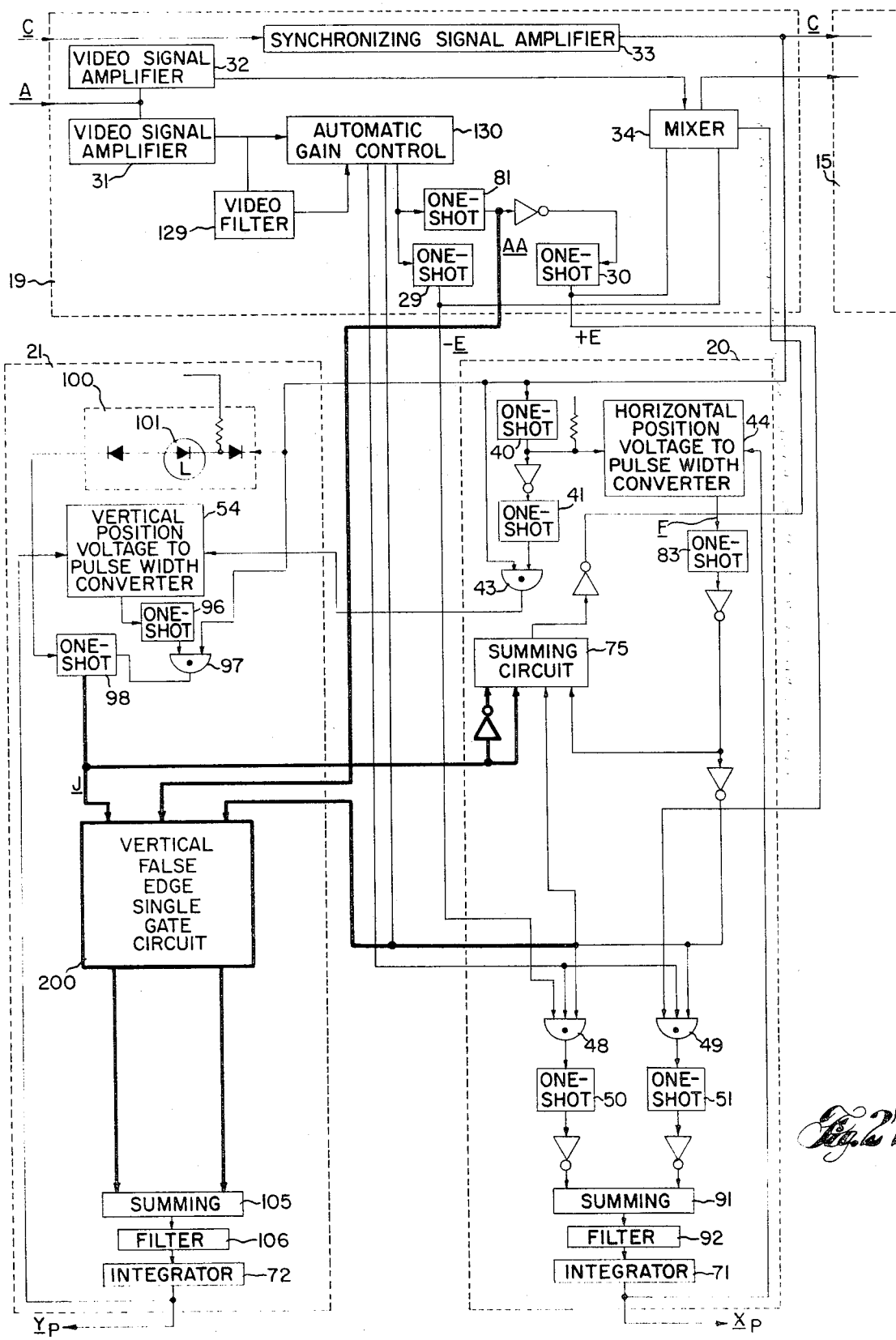

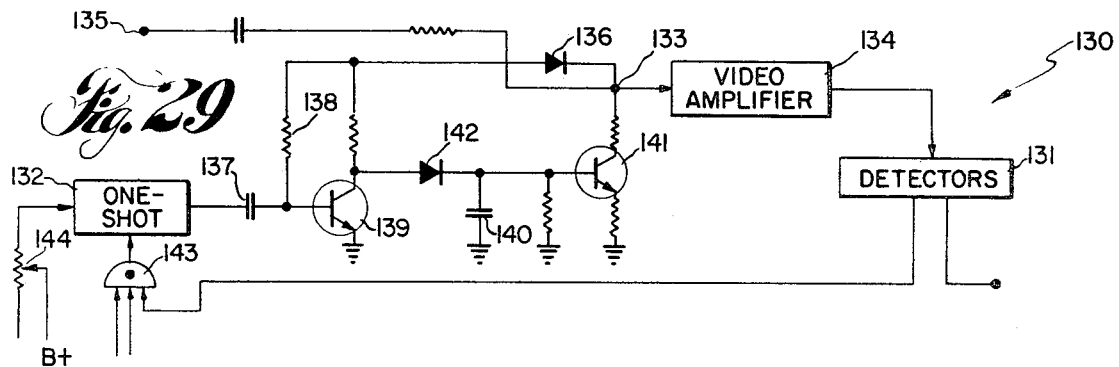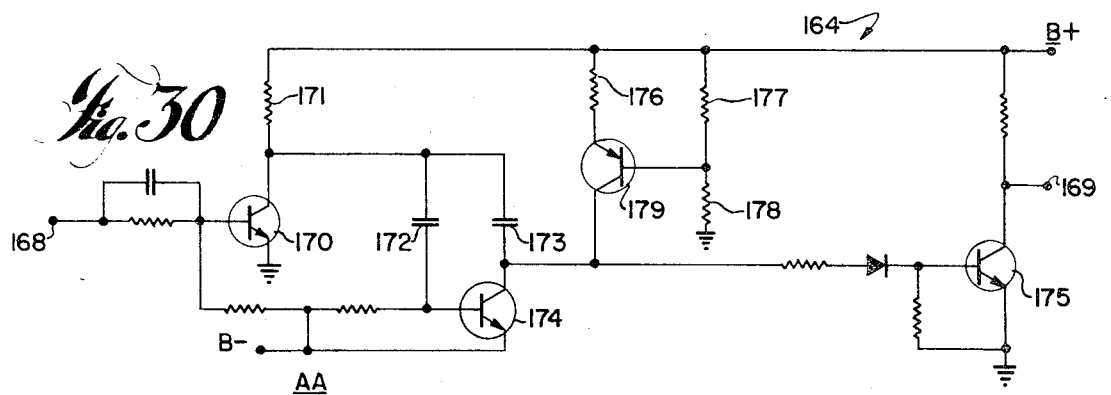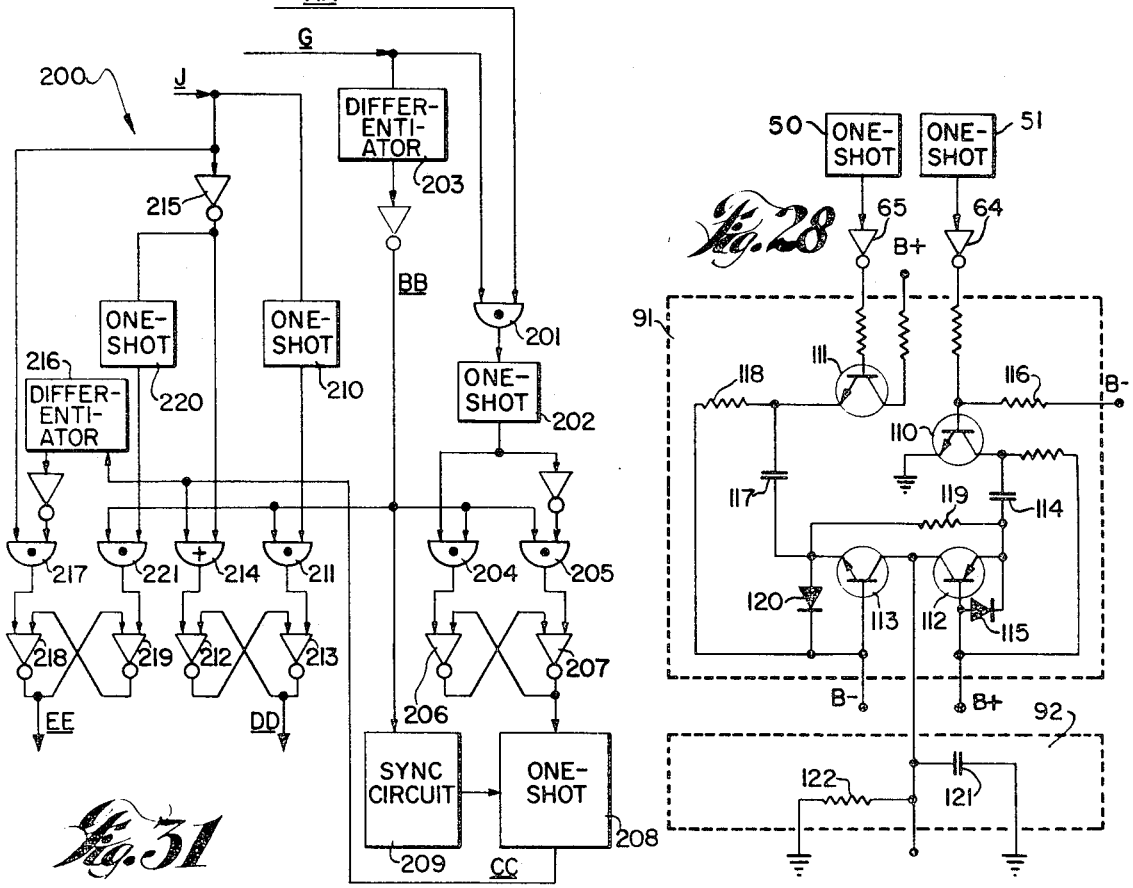

APPARATUS AND INFORMATION PROCESSING METHODS FOR A TRACKING SYSTEM TRACKER UNIT

An important object of this invention is to provide a tracking system tracker unit with apparatus and information processing methods that have utility in an incorporating tracking system to significantly increase the maximum tracking rates obtainable in an automatic mode of system operation, such maximum tracking rates also being more independent of the size, illumination, and contrast characteristics of the selected target than the corresponding rates obtained with known tracker units.

Another object of this invention is to provide a tracking system tracker unit with apparatus and information processing methods that have utility in an incorporating tracking system to significantly increase the maximum average amplitude of a pulsed tracking error detection signal sum that is the source of the output tracking error correction signal produced by the tracking system, such increased maximum average voltage amplitude being particularly important with respect to tracking system tracker units utilizing tracking error detection pulses that are based on comparatively short duration tracking gates in each direction of scan and that have a total time duration in each field of scan that is a small fraction of the field of scan period.

According to the invention, a tracker unit that is to be incorporated in a tracking system to complete a drive control between a television camera sensor unit and its driven supporting platform and that develops an analog tracking error correction signal from target marker pulses whose singular coincidence with a tracking gate indicate required tracking correction in a particular directional sense, is provided with a summing circuit means that adds like-polarity tracking error detection signals received through separate directionally-correlated input terminals and produces an output signal representing their difference (singular coincidence), such circuit means providing a constant charging current to a storage means during the receipt of singular tracking error detection signals and providing a high impedance to the stored energy to the constant charging current at other times to thereby force the stored energy to drive a low impedance load normally associated with the sequentially-following portion of the tracker unit which integrates the summing circuit output into the analog tracking error correction signal, and such circuit means being essentially comprised or parallel channels which are input switched by individual transistor components and which are properly coupled to and output controlled by other transistor components that have low current loss to the basic power supply when functioning.

In the drawings:

FIGS. 1 and 2 are plan and elevational views, respectively, of representative sensor-target viewing relations which may exist in connection with the operation of a typical tracking system;

FIG. 3 is a functional block diagram of a tracking system of the type which may advantageously incorporate a tracker unit having the features of this invention;

FIG. 4 is a functional block diagram of the construction that is basic to the type of tracker unit to which this invention applies;

FIG. 5 is an elevational view of one suitable form of the monitor unit and the command controls unit shown as separate functional blocks in FIG. 3;

FIG. 6 illustrates the display relation of the reticle and tracking gates used in the embodiments of a tracker unit detailed by FIG. 9;

FIG. 7 is a combined sectional view and functional block diagram of one form of television camera unit that has been used with the embodiments of a tracker unit shown schematically in FIGS. 9 and 24 through 27;

FIG. 8 illustrates the position of target images projected on the signal electrode of the camera tube illustrated in FIG. 7 in response to various viewing relations shown in FIGS. 1 and 2;

FIG. 10 illustrates particular circuits that are preferred in constructing the video processing section shown schematically in FIG. 9;

FIG. 11 illustrates an AND gate circuit module that is preferred in constructing the embodiments of a tracker unit shown schematically in FIGS. 9 and 24 through 27;

FIG. 12 illustrates an OR gate circuit module that is preferred in constructing the embodiments of a tracker unit shown schematically in FIGS. 9 and 24 through 27;

FIG. 13 illustrates an inverter circuit module that is preferred in constructing the embodiments of a tracker unit shown schematically in FIGS. 9 and 24 through 27;

FIG. 14 illustrates a summing circuit that is preferred for use in tracker units having the features of this invention to develop an improved monitor unit display;

Figure 9:
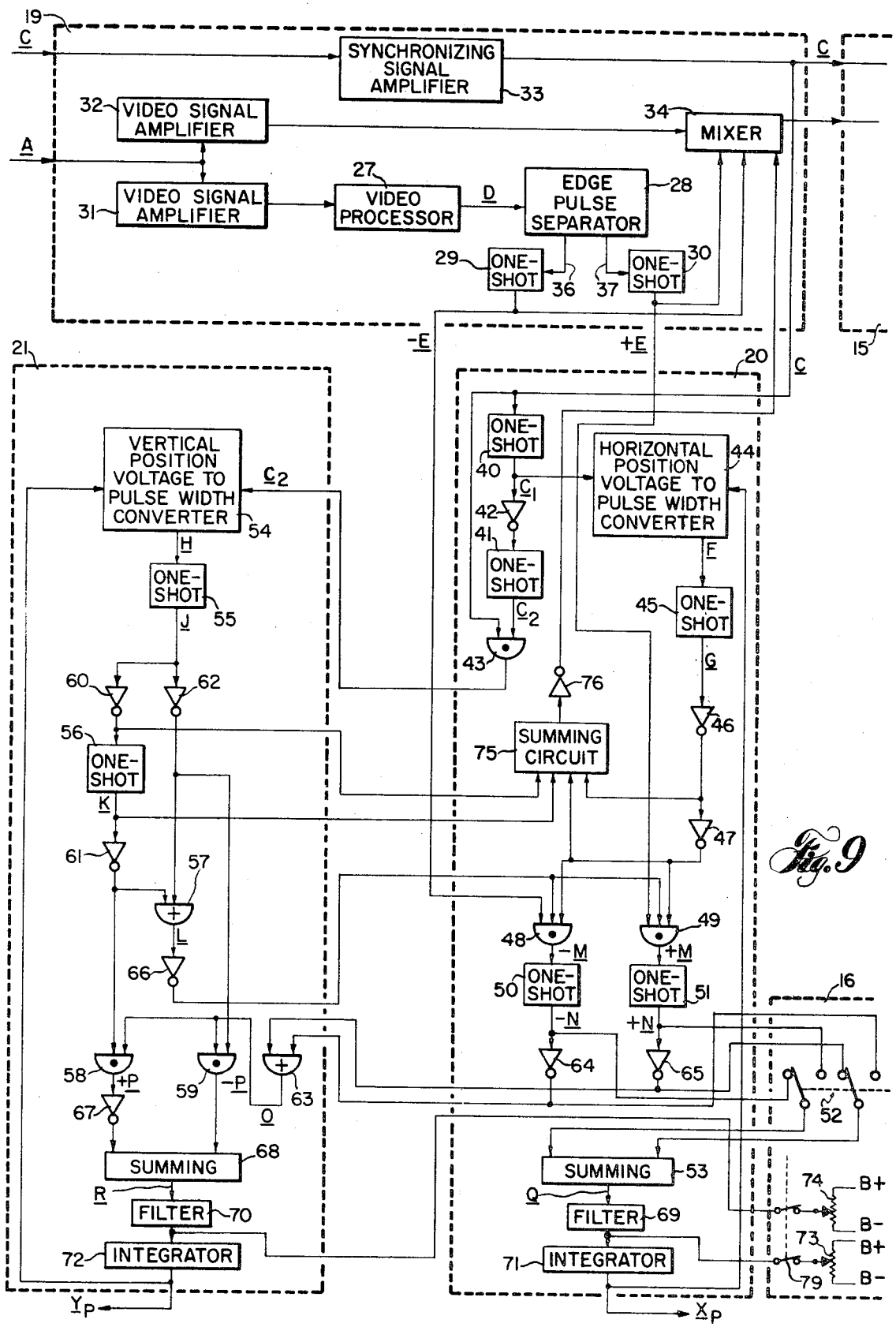
FIG. 9 is a schematic diagram of a basic embodiment of a tracker unit to which this invention has application.
Figure 24:
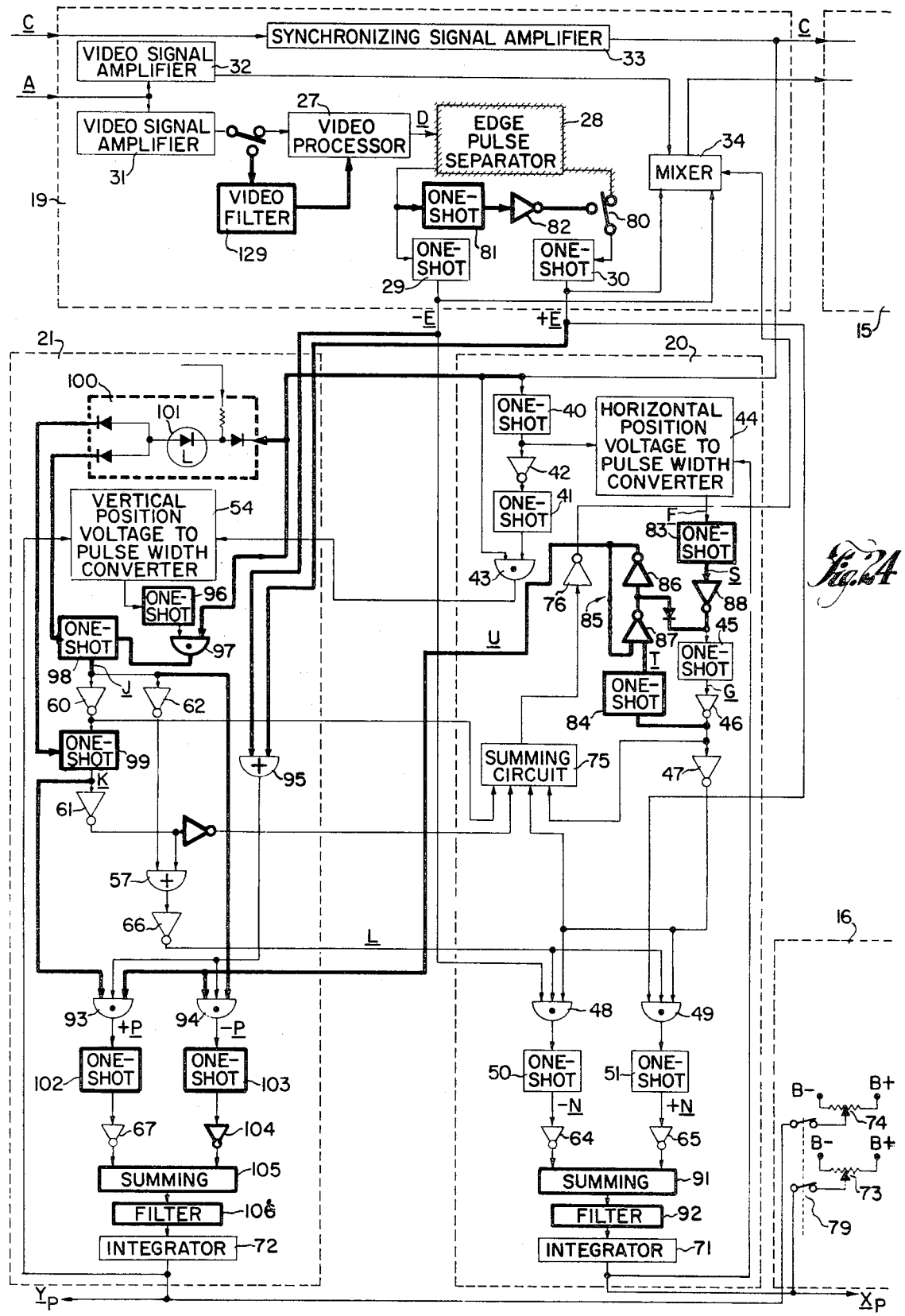
Figure 25:
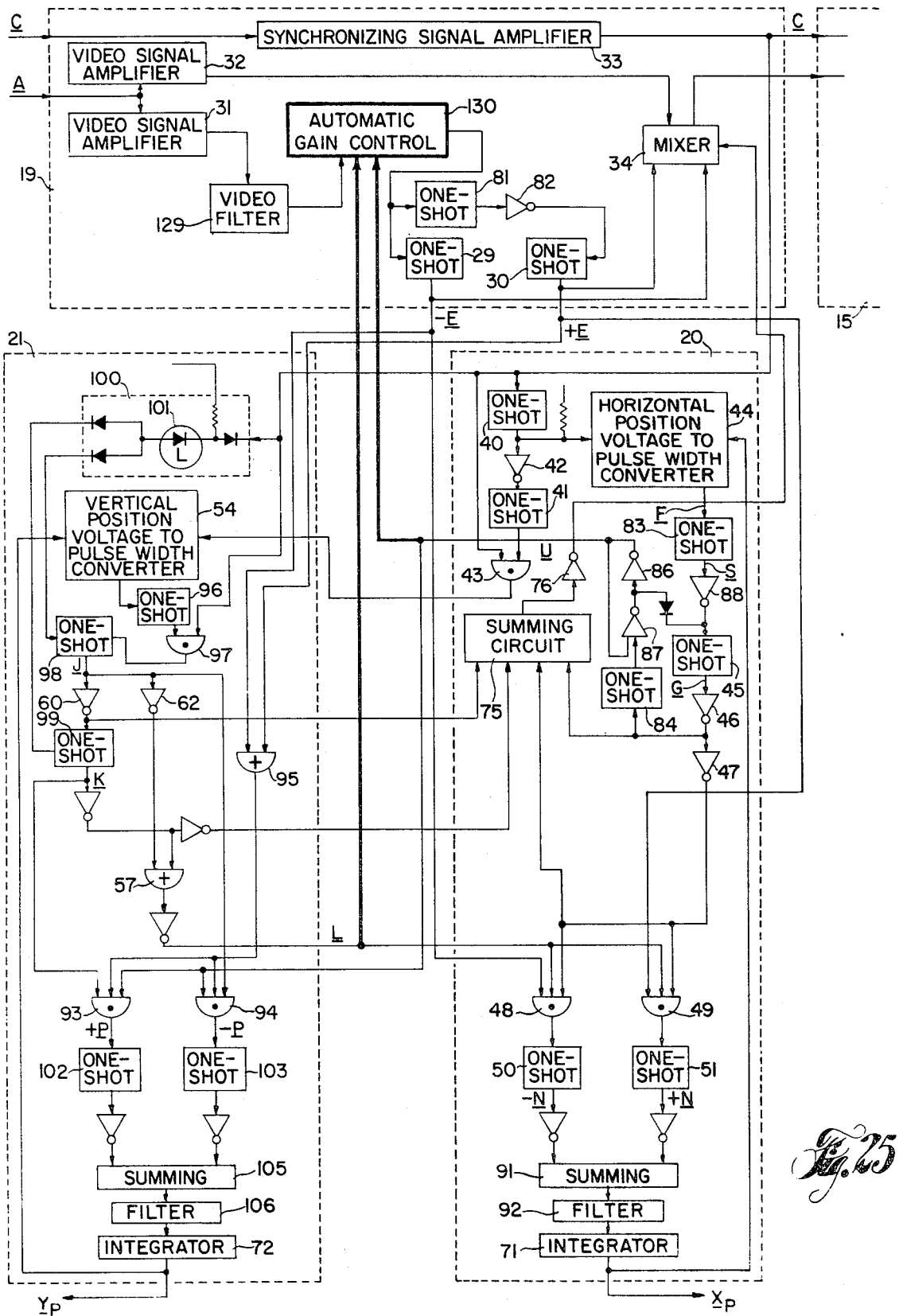
Figure 26:
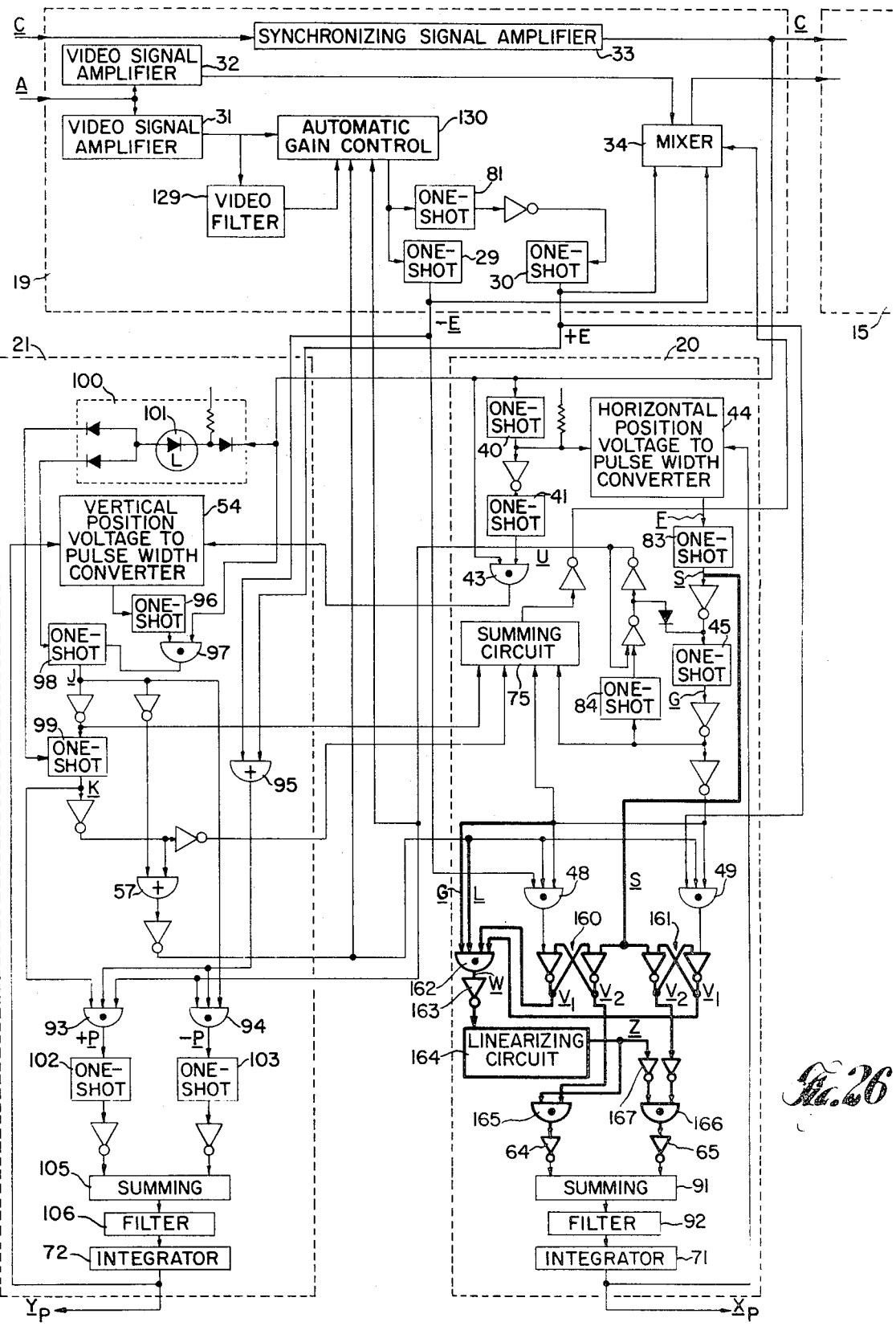

FIG. 16 details various coincidence relations that do or may exist between edge marker pulses of a selected target and the basic horizontal tracking gate pulse utilized in the FIG. 9 tracker unit embodiment;

FIGS. 17 through 23 detail key waveforms that appear at noted points within the tracker unit shown in FIG. 9 during tracking system automatic tracking operation;

FIG. 24 is a schematic diagram of a tracker unit embodiment which differs from the embodiment of FIG. 9 through the use of apparatus and method techniques relating to tracking a selected target in part by means of a false trailing edge;

FIG. 25 is a schematic diagram of a tracker unit embodiment which differs from the embodiment of FIG. 24 through the additional use of apparatus and method techniques relating to automatic gain control;

FIG. 26 is a schematic diagram of a tracker unit embodiment which differs from the embodiment of FIG. 25 through use of apparatus and method techniques relating to the utilization of tracking error signals that are proportioned in duration to the degree such tracking error signals intrude into the basic tracking gate pulse;

FIG. 27 is a schematic diagram of a tracker unit embodiment which differs from the embodiments of FIGS. 25 and 26 through use of apparatus and method techniques which relate to tracking a selected target in part by means of a vertical false edge single tracking gate pulse;

FIG. 28 details an improved summing circuit shown schematically in the tracker unit embodiment of FIG. 24;

FIG. 29 details the automatic gain control circuit shown schematically in the embodiment of a tracker unit shown in FIG. 25;

FIG. 30 details the linearizing circuit shown schematically in the tracker unit embodiment of FIG. 26;

FIG. 31 details the vertical false edge single tracking gate pulse circuit shown schematically in the tracker unit embodiment of FIG. 27;

Figures 32, 33, 34:
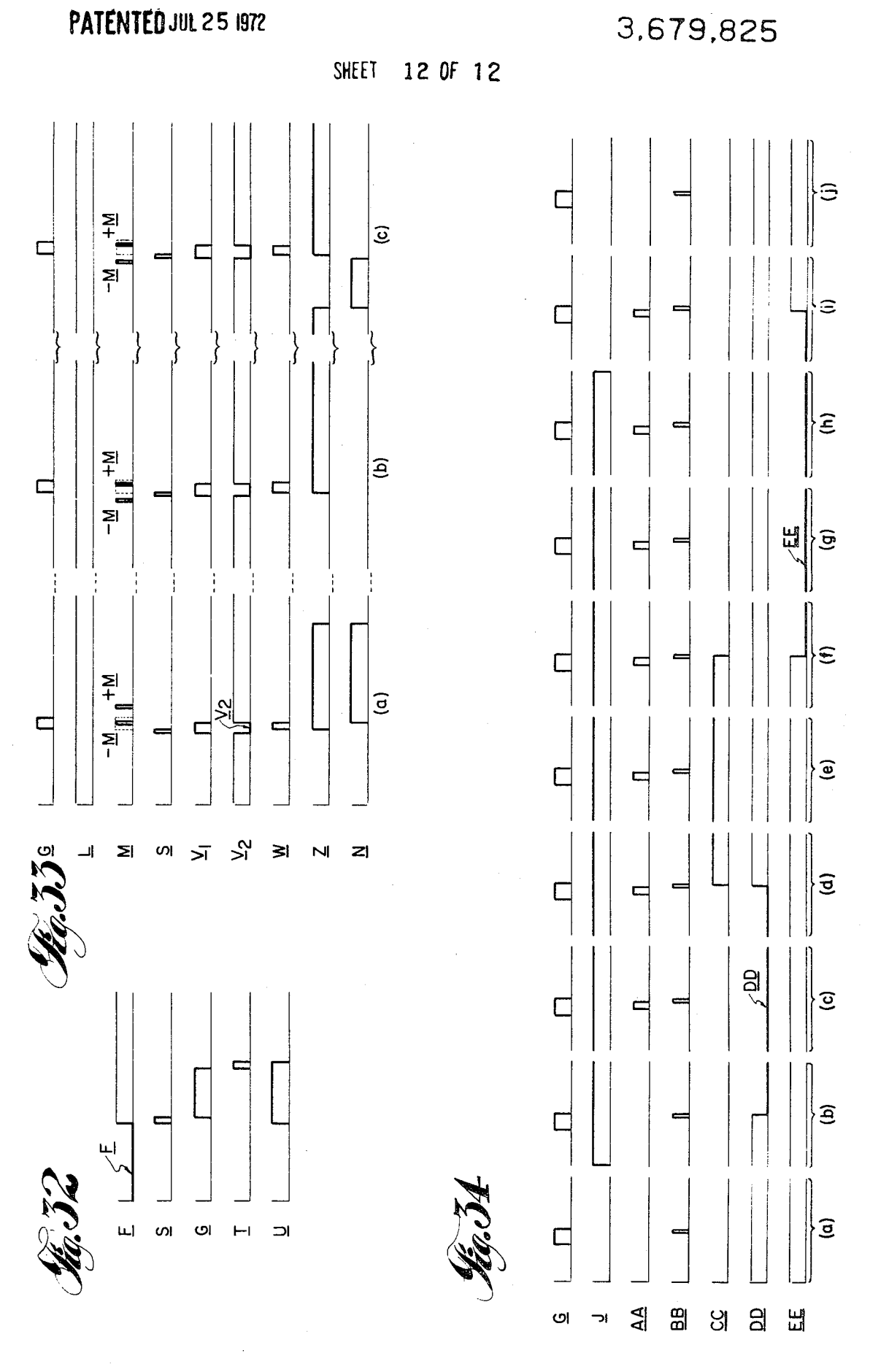

FIG. 32 details various pulse waveforms that occur in connection with operation of the tracker unit embodiments illustrated in FIGS. 24, 25, and 26;

FIG. 33 details various pulse waveforms that occur in connection with and are peculiar to operation of the tracker unit embodiment illustrated in FIG. 26; and FIG. 34 details various pulse waveforms that occur in connection with and are peculiar to operation of the tracker unit embodiment illustrated in FIG. 27.

The type of tracking system which this invention is broadly concerned with is illustrated generally by the functional block diagram of FIG. 3. Such tracking system is referenced as 10 and is basically comprised of an optical sensor in the form of television camera unit 11, a platform and drive unit 12, and a tracker unit 13. The platform portion of unit 12 serves to support television camera 11; during operation of system 10 in its automatic tracking mode the drive portion of unit 12 serves to move the platform and connected camera unit 11 in tracking relation to the relatively movable target T positioned within the field of view designated 14. Tracker unit 13 regulates tracking movement of platform and drive unit 12 and couples that unit to television camera 11 in a feedback control relation. In addition, system 10 includes a monitor unit 15 which takes the form of a typical monochrome television picture tube and which is used to present a visual display of the general tracking problem viewed by the optical sensor and an indication of system tracking alignment. A human operator provides the link which exists between monitor unit 15 and the command controls function designated 16. The operator is normally responsible for accomplishing such command functions as activating the system, selecting the system mode of operation (scanning or automatic tracking), selecting the target if choice is involved, and obtaining acquisition of the selected target in the system tracking reticle prior to locking-on for automatic system tracking. A power supply 17 of conventional form is typically included in system 10 to provide the preferred electrical energy for system operation.

FIG. 7 is included in the drawings to provide a schematic illustration of a type of television camera unit that has been utilized in a tracking system 10 which incorporated a tracker unit having the features of this invention. Such television camera unit is referenced generally as 22 and is basically comprised of a lens system 23, a camera tube 24, conventional video signal circuits 25, and conventional deflection and synchronizing circuits 26. For the purposes of this invention a specific form of television camera tube is not necessary; however, a vidicon-type camera tube such as is shown as component 24 of FIG. 7 has been utilized as the optical sensor portion of a tracking system having an actual embodiment of this invention. The specific vidicon-type camera tube 24 had a signal electrode photoconductive layer with a ⅝ × ½ inch format. The video signal circuits 25 and the deflection and synchronizing circuits 26 associated with the actually-used unit 22 operated to produce a standard one-volt television camera output video signal A and a composite horizontal and vertical synchronization signal C with a field repetition rate of 60 cycles per second. Since closed-loop circuits are normally used, it is not required that signals A and C be combined for transmission. Such signals, as used, did produce a standard raster comprised of 525 lines; interlacing of separate field frames can be used but is entirely optional insofar as the hereinafter-claimed invention is concerned. In addition, the video signal A of the actually-used FIG. 7 arrangement included blanking pulses in correlated relation to the signal C horizontal and vertical synchronization information. Equalization pulses associated with the conventional horizontal and vertical synchronization signal produced by circuits 26 are not necessary to operation of the tracking system; also it is generally preferred that the vertical synchronization pulses contained within signal C be non-serrated.

FIG. 4 illustrates the functional block construction of a tracker unit which is designated 18 and which may have any one of the several specific embodiments detailed in the drawings and in the following description; such construction may be advantageously utilized as the tracker unit for tracking systems of the type disclosed generally by FIG. 3. Tracker unit 18 is essentially comprised of a video processing section 19, a horizontal logic section 20, and a vertical logic section 21. Basically, tracker unit 18 receives the output signals of television camera unit 11 (e.g., signals A and C of the FIG. 7 means) and by preferred apparatus (circuit means) and information processing methods derives two output signals that may conveniently be used to control azimuth and elevational movement of unit 12 during the automatic tracking mode of system operation. One such output signal ($X_p$) is basically produced by horizontal logic section 20 and is an error correction signal for automatic tracking in an azimuth sense; the other output signal ($Y_p$) is basically produced by vertical logic section 21 and is an error correction signal for automatic tracking in an elevation sense. Particular schematic arrangements and detail circuits which may be used to comprise the hereinafterdescribed embodiments of tracker unit 18 are provided in connection with FIGS. 9 and subsequent of the drawings.

Several general comments are desirable with respect to the tracker unit details in the drawings. First, some of the included circuits (e.g., video signal amplifiers 31, 32, synchronizing signal amplifier 33, mixer 34, and the like) are or can be conventional in both function and construction and are sufficiently well-known so that a functional block description is adequate for disclosure purposes; details regarding their construction are generally not shown further in the drawings. However, those circuits which are fundamental to operation of any one embodiment of a tracker unit as described herein or which generally are not clearly understood by a functional description alone, are detailed in a suitable specific form elsewhere in the drawings; see FIGS. 10 through 15 for example. Since the detailed circuits are normally completely comprehended by persons reasonably skilled in the electrical-electronic circuits art from an analysis of their schematic arrangements of components and their function, particular component electrical property values are not given. In considering the following description it should also be kept in mind that each disclosed embodiment of a tracker unit in the drawings is basically of a digital-type system that processes information in pulse form; the video signal inputs to, and the tracking error correction signal outputs from, the tracker units, however, are essentially analog in form. Generally, and unless otherwise noted, it is preferred for uniformity purposes that the various disclosed pulse circuits be triggered and fired by detected positive changes in the voltage shape of a received pulse. Accordingly, it is necessary to employ various inverter circuits (e.g., the circuit of FIG. 13) in the disclosed tracker units to key triggering actions to the leading edge of negative pulses or the trailing edge of positive pulses. Details of a satisfactory dual inverter circuit module are provided in FIG. 15. Frequent reference is made in the drawings to a circuit identified as a "one-shot" (e.g., circuit 29, 45, etc.). Such circuit is better described technically as a monostable multivibrator circuit and is detailed in its typical form in FIG. 10. In those instances where the monostable multivibrator circuit employed requires a particular operating duration characteristic, such is indicated in the description. Generally speaking, the basic coupling of individual circuits to a power supply (B+ or B−) or to a necessary ground or reference value voltage is well understood and is not always shown; similarly usable signal levels are not specified herein. The tracker unit embodiments of the drawings are described in operating relation to a television camera video signal wherein increasing signal voltages are caused by increasing image brightness; by polarity reversal techniques the tracker units can be made to operate equally well using or receiving a television video signal based on a negative transmission method.

Also, unless otherwise noted, the following description refers to negative and positive voltage values and such polarities have meaning with respect to a basic viewing reference. Referring to FIGS. 1, 2, and 8, targets positioned at the center of the system tracking reticle (and also at the center of the monitor or video signal raster) require zero tracking correction and produce zero position voltages and zero value correction signals. Targets viewed in or moved to the raster left or top portions establish positive voltage signals of proportionally increasing value to indicate position location or tracking correction. Conversely, targets viewed in or moved to the raster right or bottom portions are tracked using comparatively negative voltage values to indicate position or nature of correction required. Such polarities are particularly important with respect to the output $X_p$ and $Y_p$ signals of the various tracker embodiments.

Referring to the embodiment of tracker unit 18 shown in FIG. 9 specifically, the basic functions performed by video processor section 19 are accomplished by video processor circuit 27, edge pulse separator circuit 28, and one-shots 29 and 30. The signals A and C that are received from television camera unit 11 may be amplified, as by the adjunct amplifier circuits 31, 32, and 33. In addition, a mixer circuit 34 may be incorporated in video processing section 19 for use in developing information to be utilized in monitor unit 15 to display an indication of tracking system tracking alignment. The basic output signals of video processing section 19 are contrast marker pulse signals designated +E and −E.

Basically, video processor circuit 27 receives an amplified video signal A and by differentiating operations detects all increases or decreases in signal voltage which occur within each horizontal line of camera field-of-view scan. By use of a suitably selected circuit time constant value, circuit 27 is made to provide positive and negative edge pulses D corresponding respectively to increases and decreases detected in the voltage of video signal A. A suitable transistorized circuit for accomplishing the differentiating function and for driving the pulse transformer 35 which couples circuit 27 to circuit 28 is shown in FIG. 10 using the corresponding numeral 27 reference. The output positive and negative edge pulse D are then conducted to edge pulses separator circuit 27 wherein all such edge pulses are given the same polarity (positive) but are classified and conducted into separate channels 36 and 37 on the basis of their detected plus or minus voltage slope change origin. Those edge pulses which designate increasing voltage slopes are conducted by channel 36 to one-shot circuit 29 where a squaring and stretching function is accomplished. Similarly, those edge pulses which are associated with decreasing video signal voltage changes are conducted by channel 37 to one-shot circuit 30 where a similar squaring and stretching function is achieved. Suitable component arrangements for accomplishing the functions of circuits 28 through 30 are also shown in FIG. 10 by corresponding numerical designations. Circuit 28 is essentially comprised of two transistorized inverter sub-circuits with detecting diodes 38 and 39 to act as full-wave detectors. As previously mentioned, one-shot circuit 30 (detailed in one form in FIG. 10) is aptly technically described as a monostable multivibrator circuit that is fired by the leading edge of a received positive-going pulse. The construction of one-shot circuit 29 can essentially be identical to the construction of one-shot circuit 30. In an actual embodiment of the tracker unit of FIG. 9 it was found desirable that the stretched pulse durations obtained by one-shots 29 and 30 should be approximately one-tenth to one-fifth of the video signal horizontal scan time duration that indicates the minimum image of the selected target projected on the photoconductive layer format of camera tube 24 during automatic system tracking; the output pulse durations that were actually developed were each 0.3 microseconds. The output pulse signals of one-shots 29 and 30 are designated as −$E$ and +$E$, respectively in the remaining portion of this description. Such one-shot out-put signals are hereinafter frequently referred to as marker pulses and are the previously-referenced basic output signal pulses of video processor section 18.

Since the contrast marker pulses −$E$ and +$E$ locate all contrast changes in each line of camera scan, such marker pulses will include pulses that identify the leading and trailing edge time positions of the selected target that is viewed and that is to be tracked. A +$E$ signal basically indicates a light object leading edge in a dark background or a dark object trailing edge in a light background. Conversely, a −$E$ signal is normally related to a leading edge contrast based on change from a light background to a dark object or to a trailing edge contrast based on change from a light object to a dark background. All references to light and dark are comparative only; all references to leading and trailing edges relate to camera line scanning from left to right and to sequential left and right relative positions. In the case of a negative transmission video signal, the relations (except scanning sequence) are reversed. Also, as will be more fully explained, the tracker units of the drawings can be provided with an appropriate reversing switch that enables the incorporating system to automatically track either comparatively light (white) or dark (black) targets. In this description, details of the operation of the various tracker unit embodiments are provided in terms of positive signal tracking of an essentially dark target positioned within a comparatively light background.

It is required that the operation of horizontal and vertical logic sections 20 and 21 be synchronized with the tracking problem information sensed optically by camera unit 11 and transmitted in video signal $A$. For this reason, tracker unit 18 of FIG. 9 is provided with a synchronization circuit that in one form is essentially comprised of one-shot circuits 40 and 41, intermediate pulse inverter circuit 42, and AND gate circuit 43. Such synchronization circuit is located in section 20 of the FIG. 9 arrangement only as a matter of convenience. One-shot circuit 40 is triggered by the leading edge of each synchronization pulse comprising composite signal $C$ and produces a positive pulse output signal $C_1$ having a time duration that is at least greater than the pulse width of any horizontal synchronization pulse in composite signal $C$ but that is appreciably less than the time duration of one video signal scan-line. In an actual embodiment of the FIG. 9 arrangement, a time duration of approximately one-half scan-line (e.g., 30 microseconds) has been found suitable for output pulse signal $C_1$. Such signal $C_1$ is inverted by circuit 42 so that the decreasing voltage trailing edge of $C_1$ in effect triggers one-shot circuit 41 to thereby cause circuit 41 to create a pulse signal $C_2$ that serves a triggering function and that exists only during the absence of a horizontal synchronization pulse. A comparatively short time duration (e.g., 2 microseconds) for such output pulse signal $C_2$ has proven adequate for at least one known tracker unit application. AND gate circuit 43 receives all pulses of composite synchronization signal $C$ and also all trigger pulse signals $C_2$ from one-shot circuit 41. Such trigger pulse $C_2$ is gated through AND gate 43 only when it is time coincident with a vertical synchronization pulse. See FIG. 17. The trigger pulse gated through AND gate circuit 43 also is referenced as signal $C_2$. It should be noted that signal $C_2$ is synchronized with the vertical synchronizing pulse but has a slight time lag with respect to its leading edge; such delay is not at all detrimental to the operation of vertical logic section 21.

A horizontal tracking gate pulse signal having a controlled time position in each raster scan-line is developed in horizontal logic section 20 essentially by means of controllable monostable multivibrator circuit 44 and one-shot circuit 45. Details of a suitable construction for circuit 44, also referred to as a horizontal position voltage to pulse width converter circuit, are provided in FIG. 15 using a similar reference numeral. That circuit as will be noted, is essentially a time delay circuit that is triggered by a positive-going voltage change in the leading edge of each pulse $C_1$ generated by one-shot circuit 40; such leading edges also correspond to the leading edges of the horizontal synchronization pulses in signal $C$. The output signal $F$ of circuit 44 is a negative-going pulse whose time duration from start is proportional to the magnitude of feedback analogue voltage signal $X_p$ which is developed by section 20 as a whole. (See FIG. 18 for an illustration of three different pulse $F$ durations.) Negative-going output pulse $F$ has a positive-going trailing edge that triggers or fires one-shot circuit 45. One-shot circuit 45 develops a positive output pulse $G$ which has a short time duration and which is the hereinbefore referred to basic horizontal tracking gate pulse. Such gate pulse should be somewhat longer in duration than the duration of the horizontal scan of the target image in each line of the video signal. Signal $G$ in an actual embodiment of the invention used in tracking a moving vehicle at a distance of over two miles away had a time duration of approximately 2 microseconds and was in the range of one-thirtieth to one-twentieth the duration of the non-blanked part of the video signal $A$ scan-line. Inverter circuits 46 and 47, which circuits may comprise a dual inverter circuit module such as is shown in FIG. 13, are utilized to condition horizontal tracking gate pulse $G$ for use in other portions of horizontal logic section 20.

The detection of a horizontal tracking alignment error is accomplished essentially by paired but independent AND gates 48 and 49. Details regarding a typical satisfactory construction for the AND gates used in the invention are provided by FIG. 11. AND gates 48 and 49 each utilize three input terminals of the AND gate module detailed in FIG. 11. In each instance, one of the input terminals receives the positive-going horizontal tracking gate pulse signal G originated in one-shot circuit 45 as fully inverted and re-inverted by circuits 46 and 47. Another input terminal of each such AND gate receives a vertical tracking gate pulse signal L developed within vertical logic section 21. AND gate circuit 48, in the arrangement of FIG. 9, also receives all −E edge marker pulse signals produced by one-shot 29 of video processor section 19; similar AND gate 49 is arranged to receive all of the +E edge marker pulse signals developed by one-shot circuit 30 of video processor section 19. AND gate circuits 48 and 49 each function to pass the −E and +E edge marker pulse signals through to trigger or fire one-shot circuits 50 and 51, respectively, whenever signals G and L are time-coincident therewith. When the sensor of the tracking system is properly aligned with the selected target, both a −E and a +E marker are passed through the AND gates at the time of the gate pulse. A separate waveform designation M is assigned to the passed signals resulting from the time-coincidence of horizontal and vertical tracking gates and a contrast marker pulse in AND gates 48 and 49. Such signals, which are basically tracking error detection signals, in turn are preferably extended timewise by one-shot circuits 50 and 51 to just less than one scan-line period in duration (e.g., 60 microseconds) to form the basic horizontal tracking error pulse signals N developed within tracker unit 18; such signals exist in either a −N or +N category although each would have an identical positive-going polarity form. One-shot circuits 50 and 51 are similar to circuit 30 but must each be provided with a fast-recovery capability (e.g., 0.5 microseconds).

As previously mentioned, the tracker units of the drawings may be provided with means which enable an incorporating tracking system to follow a selected light target on a comparatively dark background as well as dark targets positioned within a light background. This may basically be accomplished through use of the reversing switch 52 shown as a part of command controls function 16. In the switch 52 switching position shown in FIG. 9, the input terminal portions of summing circuit 53 are arranged for developing a positive voltage tracking error correction signal $X_p$ based on the coincidence gating of essentially only +E marker pulse signals associated with the trailing edge of an essentially dark, relatively leftward-moving target positioned in a comparatively light background. Similarly, relatively rightward movement of the target produces a proportional negative voltage error correction signal $-X_p$.

Tracker unit 18 also detects vertical tracking errors and develops related correction signals, such being accomplished essentially within vertical logic section 21. However, the apparatus and information processing methods utilized in section 21 differ somewhat in construction and function from the comparable aspects of horizontal logic section 20. The differences essentially relate to use of a different form of tracking gate; also, position information concerning the detected target is derived from horizontal logic section 20 signals rather than from video processor section 19.

Vertical tracking gate pulse signals having a controlled vertical position within the vertical extent of the complete raster produced by television camera unit 11 are developed in vertical logic section 21 essentially by means of controllable monostable multivibrator circuit 54 and one-shot circuits 55 and 56. A suitable construction for circuit 54 corresponds to the previously detailed FIG. 15 construction for circuit 44. Circuit 54 is also referred to as a vertical position voltage to pulse width converter circuit; it is a time delay circuit that is triggered by a positive-going voltage change in the leading edge of each pulse $C_2$ passed through AND gate circuit 43. Such leading edge identifies the existence of a vertical synchronization pulse within composite signal C. The output signal H of circuit 54 is a negative-going pulse whose time duration from start is proportional to the voltage of signal $Y_p$ developed by section 21 as a measure of required vertical tracking error correction for the system. Output pulse H has a positive-going trailing edge that fires one-shot circuit 56 only. One-shot circuit 56 develops a positive output pulse J having a time duration that constitutes one portion of the basic vertical tracking gate of tracker unit 18. Signal J in one actual embodiment of the invention was provided with a time duration of approximately 400 microseconds or six video signal scan-line periods; stated in another manner, signal J in time duration was preferably in the range of one-sixtieth to one one hundred twenty-fifth of the duration of the video signal A field repetition frequency. The pulse signal J output of one-shot circuit 55 is inverted by inverter circuit means 60 so that its trailing edge in effect triggers one-shot circuit 56. The output signal K of circuit 56 preferably has a form and duration corresponding to the form and duration of signal J produced by one-shot circuit 55. Output pulse signal K then constitutes the remaining portion of the basic vertical tracking gate of tracker unit 18. Signals J and K are in effect combined by OR gate 57 to form the basic vertical tracking gate pulse signal L that is required in horizontal logic section 20 on a coincidence basis to gate −E and +E contrast marker pulses through gates 48 and 49. Inverter circuits 61 and 62, like circuit 60, are provided in section 21 to develop the proper polarity for the indicated pulses at the indicated stages of signal processing. In this respect, it should be noted that OR gate 57 functions to gate negative pulses; the output of that gate in turn must be inverted, as by inverter circuit 66, to place the vertical tracking gate pulse in proper polarity condition for gates 48 and 49.

The detection of a vertical tracking alignment error is accomplished in vertical logic section 21 essentially by paired but independent AND gates 58 and 59. As in the case of AND gates 48 and 49, such vertical section gates may use the construction detailed in FIG. 11; however, AND gates 58 and 59 each utilize only two input terminals. In each instance, one of the input terminals receives a horizontal tracking error signal Q from OR gate 63; such signal is essentially made up of −N or +N horizontal tracking error signals as inverted by inverter circuits 64 and 65. The other input terminal of AND gate 58 receives the vertical tracking gate signal K developed within one-shot circuit 56 after appropriate inversion by circuit 61. AND gate 59, on the other hand, has its other input terminal arranged to receive the J pulse signal portion of the basic vertical tracking gate after it has been inverted by inverter circuit 62. Whenever an inverted −N or +N horizontal tracking error signal is received at AND gates 58 and 59 in time-coincident relation to either of vertical tracking gate pulse signals J or K, such stretched horizontal tracking error signals serve to form corresponding vertical tracking error signals that are passed through (and in the case of −P signals after inversion by circuit 67) to summing circuit 68. A separate waveform designation P is assigned to the passed signals resulting from the time-coincidence of a vertical tracking gate and a horizontal tracking error detection signal. Those tracking error detection signals which are associated with the gating action of one-shot circuit 55 only are given a −P designation; those vertical tracking error detection signals which are developed through time-coincidence with the vertical tracking gate pulse established by one-shot circuit 56 are designated as +P. Timewise in each raster, +P pulses will normally occur, if there is no vertical tracking error, after the developed −P pulses.

The remaining portions of logic section 20 (and 21) are each comprised of a summing circuit 53 (or 68), a filter circuit 69 (or 70), and an integrator circuit 71 (or 72), as shown in FIG. 9. Such additional circuits essentially function to develop appropriate tracking error correction signals ($X_p$ or $Y_p$) for controlling movement of the tracking system sensor in tracking relation to moving or movable target T. Such tracking error signals, which are basically in DC voltage analog form, also are provided as feedback signal inputs to controllable monostable multivibrator circuits 44 and 54. Detailed construction of particular circuits for carrying out the functions of circuits 53 and 69 through 72 are provided in FIG. 15. Since the constructions of circuits 68, 70, and 72 preferably correspond to the constructions of circuits 63, 69, and 71, respectively, duplicate details are not provided in the drawings.

Figure 15:
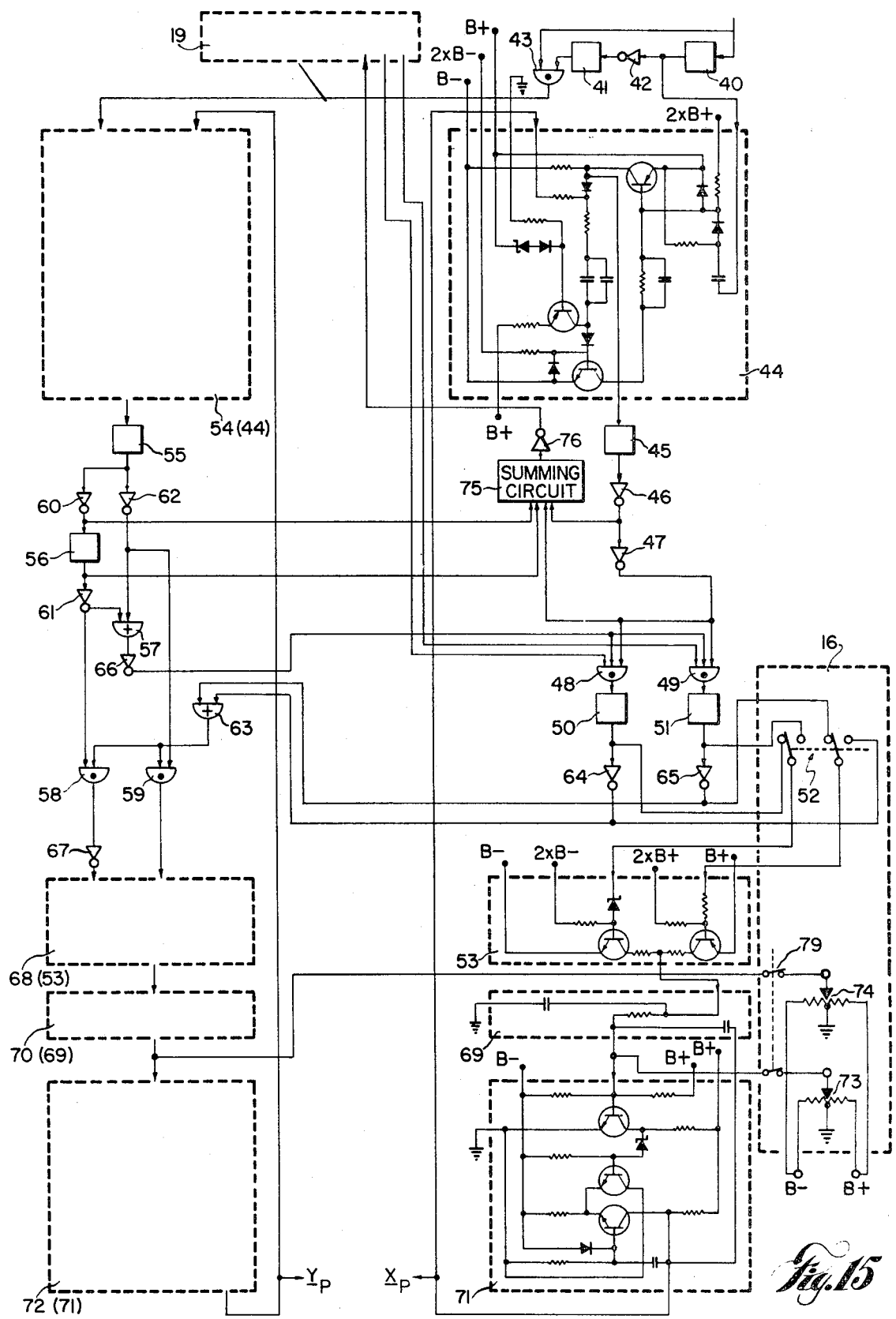
FIG. 15 illustrates particular circuits that are preferred in constructing the horizontal and vertical logic sections shown schematically in FIG. 9.

Summing circuit 53 of FIG. 15 functions to add the $-\underline{N}$ and inverted $+\underline{N}$ tracking error pulses which appear at any instant within horizontal logic section 20 during operation of the tracker unit. The output signal of summing circuit 53 is designated $\underline{Q}$; in the case of circuit 68, the output signal is identified by the reference letter $\underline{R}$. Normally, the $-\underline{N}$ and the $+\underline{N}$ signals which are introduced into summing circuit 53 are largely coincident during each scan-line period of tracking alignment and during tracking the difference seen by circuits 69 and 71 is essentially zero. However, when there is tracking misalignment a sequence of $-\underline{N}$ or $+\underline{N}$ pulses are present and do cause error correction signals to be developed in the subsequent portion of the tracker unit. (See FIG. 23 for specific examples.) In the case of summing circuit 68, however, the input tracking error signals $-\underline{P}$ and inverted $+\underline{P}$ are entirely non-coincident. This is because vertical tracking gate pulses $\underline{J}$ and $\underline{K}$ are derived sequentially.

Filter circuits 69 and 70, details for which are given in FIG. 15, are provided in the invention so as to essentially average out or smooth the pulsed output signals $\underline{Q}$ and $\underline{R}$ so as to be in usable form for integrator circuits 71 and 72. Circuits 69 and 70 are substantially identical in function but differ in that filter circuit 70 must essentially respond to $\underline{R}$ signals which normally occur in sequential groupings. Up to six successive individual pulses may comprise each such grouping in the case of specific one-shot circuits 55 and 56 each having a 400 microsecond output. Integrator circuits 71 and 72 respond essentially to the output of circuits 53 and 68; their outputs are inverted relative to the polarity of the inputs to the summing circuits 53 and 68. See FIGS. 22 and 23.

FIG. 15 (and also FIG. 9) provides schematic details of certain manually operated controls that may be desirably incorporated in command control function 16 to facilitate operation of tracker unit 18. Such specific command controls include reversing switch 52, acquisition potentiometer means 73 and 74, and selection switch 79. A basic on-off switch is generally desirable but is not shown in the drawings. As previously explained, reversing switch 52 is provided so as to improve the capability of tracker unit 18 to follow essentially light targets existing on a comparatively dark background as well as the indicated dark target positioned on a light background. Potentiometer means 73 and 74 may be operated relative to an intermediate zero potential or ground voltage value to either of the indicated maximum $\underline{B}-$ and $\underline{B}+$ supply voltages. In the specific embodiment of the invention shown in FIGS. 1 through 15, a zero output voltage associated with signal $\underline{X}_p$ positions the horizontal tracking gate pulse at the horizontal center of the television camera video signal scan-line. $\underline{B}+$ $(+\underline{X}_p)$ values position the gate toward the left extreme (FIG. 5) of the resulting raster; basically, the degree of displacement from the center is directly proportional to the magnitude of the developed positioning voltage value. Similarly, potentiometer means 73 may be manually positioned to $\underline{B}-$ $(-\underline{X}_p)$ voltage values to displace the horizontal tracking gate pulse proportionately to the right (FIG. 5) of the raster horizontal center position. In a similar manner, potentiometer means 74 may be moved manually to obtain $\underline{B}-$ and $\underline{B}+$ voltage values to displace the vertical tracking gate pulses $\underline{J}$ and $\underline{K}$ in their natural time sequence below or above, respectively, the vertical center of the video signal output raster. Scan-track switch 79 must be closed as shown in the drawings to facilitate initial target acquisition for automatic tracking; once acquisition of the target is obtained, switch 79 may be opened to make potentiometer means 73 and 74 inoperative and to place movement of the tracking system optical sensor and tracking gate pulses under the complete locked-on control of tracking error correction signals $\underline{X}_p$ and $\underline{Y}_p$ produced by logic sections 20 and 21.

The television picture tube element normally included in monitor unit 15 basically receives video signal $\underline{A}$ and synchronization signal $\underline{C}$ for developing a conventional visual presentation of the general tracking problem to be observed by the system operator. The visual display prevented thereby, however, may be significantly enhanced by other features of this invention. Such enhancement is accomplished by means of summing circuit 75 and by means of the $-\underline{E}$ and $+\underline{E}$ edge marker pulse signals developed in circuits 29 and 30. Summing circuit 75, details for which are provided in FIG. 14, develops so-called cross-hair pulse information for presentation on the screen of monitor unit 15. Such cross-hair pulse information develops the paired horizontal cross-hair lines 77 and the paired vertical cross-hair lines 78 shown in FIG. 5. The rectangular area defined by and located within the intersection of cross-hair lines 77 and 78 comprise the tracker unit 18 reticle. For tracking with the FIG. 9 unit, the selected target is located entirely within the reticle for target acquisition or lock-on purposes. See FIG. 5 and the target display reference $\underline{T}_o$. FIG. 6 shows the makeup of that reticle in terms of the duration of tracking gate pulses $\underline{G}$, $\underline{J}$, and $\underline{K}$. The cross-hair pulse information is developed in circuit 75 essentially by differentiator sub-circuits that detect negative-going voltage changes in the leading and trailing edges of the appropriate gate pulses. More specifically, one input terminal of circuit 75 receives signal $\underline{G}$ after a single inversion and detects its leading edge; another input terminal of circuit 75 receives pulse $\underline{G}$ after a double inversion by circuits 46 and 47 and detects its negative-going trailing edge. Such detected edges comprise, after inversion and mixing, the cross-hair pulses that form dark cross-hair lines 78. In a similar manner, signals $\underline{J}$ (after inversion by circuit 60) and $\underline{K}$ are conducted to summing circuit 75 where their leading and trailing edges, respectively, are detected. The differentiated detected leading and trailing edges of the vertical gate pulses are afterwards introduced into monitor unit 15 to comprise horizontal cross-hairs 77.

This display developed for monitor unit 15 may also be enhanced by appropriate use of edge marker pulses $-\underline{E}$ and $+\underline{E}$ as follows. Mixer circuit 34 can function to gate those edge (contrast change) marker pulses which are time-coincident with tracking gate edge pulses developed in summing circuit 75 and amplify such passed pulses for presentation in the picture tube of monitor unit 15. The so-gated and so-amplified marker pulses give a display indication to the operator that tracker unit 18 is actually following the selected and displayed target contained within video signal $\underline{A}$.

FIG. 16 is provided in the drawings to illustrate various coincidence relations that do (or may) exist as between edge marker pulses associated with a selected target and the basic horizontal tracking gate pulse. Preferably, the $-\underline{E}$ and $+\underline{E}$ edge marker pulses associated with the leading and trailing edges of a selected target are positioned entirely within the horizontal tracking gate pulse as shown in FIG. 16($a$). If the target is moved to the left relative to the viewing axis of the system optical sensor as in the case of a movement toward position $\underline{T}_2$ from aligned position $\underline{T}_o$ of FIGS. 1 through 3, the $-\underline{E}$ leading edge pulse will become coincident with the leading edge of the horizontal tracking gate pulse (FIG. 16($b$)). Inasmuch as coincidence is maintained as between the tracking gate pulse and at least a part of each target edge marker pulse such being a non-singularly coincident pulse relation, no tracking alignment error is detected. Complete absence of but one of the two target edge marker pulses from within the tracking gate (FIG. 16($c$)), i.e., a singularly coincident pulse relation, caused development of a tracking error signal based on the coincidence of the remaining interiorly-positioned target trailing edge marker pulse. Such error correction signal, as processed through summing circuit 53, filter circuit 69, and integrator circuit 71, in effect causes the horizontal gate to be repelled away from the coincident singular target edge marker pulse and toward the "escaped" target opposite edge (target interior) marker pulse, i.e., toward a non-singularly coincident pulse relation. Relative movement between the target and the horizontal tracking gate in an opposite direction will cause tracking gate conditions corresponding to the relations shown in FIGS. 16(d) and 16(e). Sufficient rightward movement of the target will ultimately result in only the target leading edge being coincident with the horizontal tracking gate pulse so as to cause an error signal indicating a need for tracking correction. See FIG. 16(e). FIG. 16(f) illustrates the situation which occurs when the selected target in effect outruns the established horizontal tracking gate. This situation is commonly referred to as an "unlock" situation; it occurs whenever the relative movement between the selected target and the optical sensor occurs at a rate that exceeds the maximum obtainable tracker unit tracking rate. FIG. 16(g) illustrates the minimum target edge marker pulse separation which generally may be permitted with respect to successful actual embodiments of the tracker units described herein. The improved tracking rates which are obtained with the disclosed embodiments result chiefly from those wherein the distance between the target edges (edge marker pulses leading edges) is not less than one-tenth the duration of the horizontal tracking gate. The net effect of closing movement of the target relative to the tracker, or vice versa, is illustrated by FIG. 16(h). As shown therein, the spacing between the target edge marker may increase relative to its projection on the television camera tube sensor format so that the edge marker pulses may become coincident with the gate pulse edges. Whenever the separation between the selected target marker pulses exceeds one gate width, there is a recognized possibility of losing tracking control over the selected target.

FIG. 17 illustrates the various signals which occur within video processor section 19 and the synchronization circuit included as a matter of convenience within horizontal logic section 20. The signals of the first line within FIG. 17 detail typical positive transmission video signals produced by camera unit 11 during scanning of a general tracking problem. The first (a) and second-last (e) line portions of signal $\underline{A}$ in FIG. 17 shows a representative background situation; the second (b) through fourth (d) line portions show the effect of a dark target $\underline{T}$ positioned against a comparatively light background. The last line portion (f) shows the presence of a vertical blanking pulse; horizontal blanking pulses occur in each of the other line portions at the trailing region. The horizontal and vertical synchronizing pulses produced by television camera unit 11 appear on the line designated $\underline{C}$. Also superimposed on that line are the pulses $\underline{C_1}$ and $\underline{C_2}$ used to logically determine the existence of a vertical synchronization pulse in the composite synchronization signal. The last line of FIG. 17 shows the waveform $\underline{H}$ which occurs as the result of detecting a vertical synchronizing pulse in the composite synchronizing signal. Marker pulses detecting each contrast change occurring within a scan-line are designated $\underline{D}$. By appropriate manual or automatic sensitivity control, the number and degree of contrast change detected within a typical scanline may be varied. A variable amplification function carried out within video amplifier section 31 may be adequate for this purpose. The resulting rectified and squared edge marker pulses are appropriately designated $+\underline{E}$ and $-\underline{E}$ in the signal line designated $\underline{E}$.

FIG. 18 illustrates the effect of the logic section output signal $\underline{X_p}$ on the positioning of the horizontal tracking gate pulse within each video scan-line. The first and third line portions indicate situations wherein the gate pulse has been in effect moved significantly to the left or significantly to the right relative to the television picture tube raster centerlines. In the case of the first line portion (a) of FIG. 18, a large $+\underline{X_p}$ signal will move marker pulse $\underline{G}$ leftward a proportional degree. The second line portion (b) of FIG. 18 shows the positioning of the gate pulse $\underline{G}$ at the horizontal center of the television picture tube raster by means of delay signal $\underline{F}$ produced by a zero feedback input voltage. The zero feedback voltage is used to reference operation of the tracker unit to the center of the television raster. FIG. 18(c) illustrates a situation wherein a high negative voltage horizontal tracking error correction signal is utilized to move the horizontal tracking gate $\underline{G}$ toward the extreme right portion of the television camera raster.

FIG. 19 illustrates the relations which exist as between vertical tracking signal $\underline{L}$ and its variably-positioned and sequentially-fired gate pulses $\underline{J}$ and $\underline{K}$. It should be noted that the leading edge of gate pulse $\underline{J}$ is coincident with the trailing edge of variable duration positioning pulse $\underline{H}$. Similarly, the leading edge of gate pulse $\underline{K}$ is coincident with the trailing edge of gate pulse $\underline{J}$. Pulse signal $\underline{L}$ is the inverted composite of pulses $\underline{J}$ and $\underline{K}$ and is commonly referred to as the vertical gate pulse that is conducted to horizontal logic section 20 for use in gating edge marker pulses that are coincident therewith and with the basic horizontal tracking gate pulse. As previously commented, the trailing edge of pulse signal $\underline{H}$ is positioned time-wise from the start of each vertical scan in proportion to the magnitude of the $+\underline{Y_p}$ or $-\underline{Y_p}$ error correction signal that is the output of vertical logic section 21. In the arrangements shown in the drawings, if the $\underline{Y_p}$ signal is of zero voltage value, the trailing edge of pulse $\underline{H}$ is normally positioned just slightly above the center of the raster vertical centerline.

FIG. 20 illustrates typical coincidence relations that exist as between $-\underline{E}$ and $+\underline{E}$ target edge marker pulses and horizontal gate pulse $\underline{G}$ during automatic operation of the tracking system. As noted therein (FIG. 20(c), for instance), whenever a $+\underline{E}$ pulse only is coincident with a horizontal tracking gate pulse $\underline{G}$, the resulting passed pulse $(+\underline{M})$ by triggering one-shot circuit 51 produces a $+\underline{N}$ pulse of approximately one-line duration; no $-\underline{M}$ or $-\underline{N}$ pulses are developed in the same scan-line. Although not shown, in those instances in which a $-\underline{E}$ pulse only is coincident with horizontal tracking gate pulse $\underline{G}$ (as during extreme rightward movement of the selected target relative to the sensor viewing axis), a $-\underline{N}$ tracking error detection pulse is generated within any one video signal horizontal scan-line. Signal $\underline{O}$ is produced by OR gating the developed $\underline{N}$ tracking error detection pulses through OR gate circuit 63 in tandem. During proper tracking system sensor alignment with the selected target both $-\underline{N}$ and $+\underline{N}$ tracking error detection pulses will be provided within each video signal scan-line. However, such pulses in effect cancel each other in summing circuit 53 to indicate that no tracking horizontal correction is in fact required. In those tracking situations wherein alignment correction is required, a grouping of several consecutive $-\underline{N}$ or $+\underline{N}$ pulses will generally exist within an individual field scan. Assuming that the duration of vertical gate pulses $\underline{J}$ and $\underline{K}$ are each approximately six scan-lines and assuming that the target essentially extends vertically through the duration of the vertical tracking gates, the resulting grouping may consist of as many as 12 consecutive tracking error detection pulses.

FIG. 21 shows generally similar tracking error detection pulse waveforms $+\underline{P}$ and $-\underline{P}$ developed within vertical logic section 21. It should be noted that each part of tracking error detection pulse signal $\underline{O}$ is essentially passed through either gate 58 or gate 59 if coincident with either a vertical tracking gate pulse $\underline{K}$ or $\underline{J}$, respectively. During proper alignment of the tracking system sensor viewing axis with the selected target in the automatic mode of system operation, $-\underline{P}$ and $+\underline{P}$ pulses will occur in sequential groupings of individual pulses. Assuming that the time duration of the gates produced by one-shot circuits 55 and 56 are each approximately six lines and assuming that the tracker unit is detecting one or both of the target edges so as to develop signal $\underline{O}$ in each scan-line, as many as 12 successive $\underline{P}$ pulses in two different groupings may occur.

FIG. 22 shows the typical relations which exist as between $-\underline{N}$ and inverted $+\underline{N}$ pulses in the FIG. 9 arrangement and within an individual scan-line. In those instances where both target edge marker pulses are within the basic horizontal tracking gate the resulting tracking error detection signals are in effect cancelled by appropriate addition in summing circuit 53 and do not develop a tracking error correction signal $\underline{X_p}$; however, when a single edge marker pulse is coincident with the basic horizontal tracking gate pulse, an unopposed $\underline{N}$ pulse is developed and serves to activate the subsequent circuits 53, 69, and 71 to produce a usable correction signal of proper polarity and magnitude. Filter circuit 69 essentially serves to smooth out the differences of the $-\underline{N}$ and $+\underline{N}$ signals in any one scan-line to desirable levels; through proper design for integrator circuit 71 and in certain tracker unit applications it is possible to eliminate the need for filter circuit 69.

FIG. 23 details the typical error correction signals $\underline{X}_p$ that are developed from intermediate signals $\underline{Q}$ in response to tracking error detection pulses indicating a system requirement for re-alignment of the sensor viewing axis relative to the selected target. The time periods represented by the FIG. 23(a) and (b) combination and by the FIG. 23(c) and (d) combination are each essentially one vertical scan-time or a total of approximately 525 individual scan-lines in duration. It should be noted from FIG. 23 that a grouping of $-\underline{N}$ pulses indicating that a relatively rightward-moving target leading edge is coincident with the basic horizontal tracking gate produces negative-going output signals $\underline{Q}$ and $\underline{X}_p$ that drive the tracking gate rightwardly away from the coincident target edge and toward the target interior and opposite or trailing edge. Similarly, a grouping of inverted $+\underline{N}$ pulses (FIG. 23(c)) indicating that a relatively leftward-moving target trailing edge is coincident with the basic horizontal tracking gate produces positive-going output signals $\underline{Q}$ and $\underline{X}_p$ that drive the tracking gate leftwardly away from the coincident target edge and toward the target interior and opposite or leading edge. This principle of operation prevails in other embodiments of tracker unit 18 even though the basic horizontal tracking gate pulse be modified so that the gate falls entirely within or intermediate the target edges rather than the target edges normally being positioned entirely within the limits of the basic horizontal tracking gate.

Various modifications may be made to the tracker unit embodiment of FIG. 9 to improve overall tracking performance in several respects. Alternate tracker embodiments having such improved performance capability are disclosed by FIGS. 24 through 27; associated circuit and signal processing techniques are illustrated by FIGS. 28 through 34. To the extent that a detailed description is required for the alternate embodiments, reference should be made to copending application Ser. No. 403,398 also filed Oct. 12, 1964 and assigned to the assignee of the instant application. However, important improvements realized in accordance with the objectives of this invention are achieved by the summing circuit 91 incorporated in the tracker unit embodiment of FIG. 24 as an alternate to the summing circuit 53 disclosed in FIG. 9. A description of the invention is provided in greater detail in the following paragraphs.

Summing circuit 91 of the FIG. 24 tracker unit embodiment is provided to obtain a significantly increased average output voltage for output signal $\underline{Q}$. As disclosed by FIG. 23 of the drawings, the total duration of the stretched-out tracking error detection pulses which are the base for signal $\underline{Q}$ is an extremely small percentage of the time of one complete field (vertical) scan. In a tracker unit having vertical tracking gate pulses developed in each of one-shot circuits 55 and 56 of six lines duration, 12-volt amplitude error detection pulses have a maximum average output voltage in a full vertical field (525 scan lines) of approximately 0.275 volts. Summing circuit 91 as actually provided increased such average output voltage approximately 12-fold to a value of 3.3 volts.

In the detailed construction of circuit 91 disclosed in FIG. 28, transistor components 110 and 111 are normally "on." Additional transistor components 112 and 113 are normally "off." Capacitor 114 is charged to approximately B+ volts by transistor component 110 and through silicon diode 115. When transistor component 110 is turned off by the negative-going inverted output of one-shot circuit 51, its collector voltage rises. This rise in turn is coupled to the emitter of transistor component 112. When the emitter of transistor 112 has become sufficiently positive, that component turns on and capacitor 114 begins to discharge through resistor 118 and such emitter. In this arrangement, the discharge current of capacitor 114 corresponds to the emitter current of transistor component 112; such current also essentially corresponds to the collector current of transistor 112. The current through resistor 116 is a constant current for transistor component 112 and consequently for the load filter capacitor 121 in the additionally detailed filter circuit 92. Capacitor 114 is made sufficiently large to insure that there is negligible voltage change on it during the time the output of one-shot circuit 51, as inverted by inverter circuit 65, is negative.

In a similar manner, a negative-going inverted output from one-shot circuit 50 will cause capacitor 117 to discharge through the emitter of transistor component 113 and through resistor 118 to provide an opposite current for the output. Thus, the output will be either positive or negative. Transistor components 112 and 113 are reverse-biased between pulses by the current through resistor 119 and through diodes 115 and 120. Between chargings of the circuit, capacitor 121 discharges through load impedance 122 only as the output of the circuit is a high impedance during this time.

I claim:

1. In a tracking system tracker unit which generates electrical tracking error correction signals of different relative polarities in response to developed tracking error detection pulses based on spaced-apart target marker pulses that are singularly coincident with tracking gate pulses to indicate different directions of desired tracking error correction, the summing circuit means improvement comprising:
   a. A pair of input terminal means each of which receives different target error detection pulses correlated to detected tracking error in a specific direction,
   b. A pair of input switching transistor means each base-coupled to one of said input terminal means,
   c. A pair of output control transistor means collector-coupled to each other and each base-coupled to a power supply of different relative polarity,
   d. A pair of capacitor means each emitter-coupling one of said output control transistor means to one of said input switching transistor means,
   e. A pair of resistor means each base-coupling one of said output control transistor means to one of said input switching transistor means, and
   f. Output terminal means connected to said output control transistor means collector coupling, said capacitor means and said resistor means providing a pulsed constant charging current at said output terminal means that has pulse durations substantially corresponding to the summed time difference of said tracking error detection pulses that exist at said input terminal means and said base-coupled input switching transistor means.

2. The invention defined by claim 1, wherein said summing circuit means is provided with bias means coupled to each of said pair of output control transistor means, said bias means reverse-biasing said output control transistor means to provide said summing circuit with a high impedance at said output terminal means during periods when said tracking error detection pulses are not received at said input terminal means and said input switching transistor means.

3. In a tracking system tracker unit which generates electrical tracking error correction signals in response to the difference sum of different tracking error detection pulses that are derived in part from a television camera sensor unit video signal that has both a maximum average voltage amplitude and a total duration which is a relatively small fraction of each television camera sensor unit video signal field of scan, the circuit means improvement comprising:
   a. Input terminal means which receive spaced-apart target error detection pulses that are of approximately one scan line maximum individual duration, that are related to detected tracking error in different opposed directions, and that have a total time duration in each television camera sensor unit field of scan which is a small fraction of such field of scan time period,
   b. Charging component means connected to said input terminal means and which receives and stores a charge during a large fraction of said field of scan time period that is not coincident with said target error detection pulses and which discharges said charge as a pulsed constant charging current having pulse durations which correspond to the durations of said target error detection pulses in said field of scan time period television camera sensor unit, and c. Load means converting the energy of said pulsed constant charging current from pulsed form into continuous form for integration to form said tracking error correction signal, said load means receiving a pulsed signal from said charging component means of maximum average voltage amplitude significantly increased above said tracking error detection pulse maximum average voltage amplitude.

4. In a method of converting tracking error detection pulses based on spaced-apart target marker pulses that are singularly coincident with tracking gate pulses to indicate different directions of desired tracking error correction into a pulsed difference sum tracking error detection signal which sources an analog tracking error correction signal, the improvement comprising the steps of:

a. Extending the time duration of each of said tracking error detection pulses from a time duration corresponding to the duration of one of said target marker pulses to a time duration of approximately one scan-line period of the television camera sensor unit output video signal which sources said target marker pulses, b. Adding the extended tracking error detection pulses and developing their time periods into a pulsed constant current charge, and c. Converting said pulsed constant current charge into the tracking error detection signal that is essentially continuous approximately during the period of the television camera sensor unit scan field, said pulsed constant current charge having a maximum average voltage amplitude which is substantially increased over the maximum average voltage amplitude of the extended tracking error detection pulses during their singularly existent time period.

* * * * *